US006257045B1

(12) United States Patent
Hosokawa et al.

(10) Patent No.: US 6,257,045 B1
(45) Date of Patent: *Jul. 10, 2001

(54) AUTOMATED SUBSTRATE PROCESSING SYSTEMS AND METHODS

(75) Inventors: Akihiro Hosokawa, Cupertino; Richard Ernest Demaray, Portola Valley; Makoto Inagawa, Menlo Park; Ravi Mullapudi, Sunnyvale; Harlan L. Halsey, Woodside; Michael T. Starr, San Jose, all of CA (US)

(73) Assignee: Applied Komatsu Technology, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/392,110

(22) Filed: Sep. 8, 1999

Related U.S. Application Data

(63) Continuation of application No. 08/949,207, filed on Oct. 10, 1997.

(51) Int. Cl.[7] .................................................... G01J 1/00
(52) U.S. Cl. ............................................................ 73/1.79
(58) Field of Search .................................... 73/865.8, 1.79, 73/1.81, 865.9; 414/935, 936, 939, 940

(56) References Cited

U.S. PATENT DOCUMENTS

| 4,158,171 | 6/1979 | Abbe et al. . |
| 4,344,160 | 8/1982 | Gabriel et al. . |
| 4,409,087 | 10/1983 | Quick . |
| 4,457,664 | 7/1984 | Judell et al. . |
| 4,513,430 | 4/1985 | Vora et al. . |
| 4,603,466 | 8/1986 | Morley . |
| 4,657,621 | 4/1987 | Johnson et al. . |
| 4,697,089 | 9/1987 | Drage . |
| 4,727,593 | * 2/1988 | Goldstein . |
| 4,770,590 | 9/1988 | Hugues et al. . |
| 4,819,167 | 4/1989 | Cheng et al. . |
| 4,836,733 | 6/1989 | Hertel et al. . |
| 4,873,447 | * 10/1989 | Imahashi . |
| 4,875,005 | 10/1989 | Terada et al. . |
| 5,054,991 | 10/1991 | Kato . |
| 5,102,280 | 4/1992 | Poduje et al. . |
| 5,103,367 | 4/1992 | Horwitz et al. . |

(List continued on next page.)

FOREIGN PATENT DOCUMENTS

| 63-194345 | 11/1988 | (JP) . |
| 6-156624 | 6/1994 | (JP) . |
| 7130830 | 5/1995 | (JP) . |

Primary Examiner—Robert Raevis
(74) Attorney, Agent, or Firm—Konrad Raynes & Victor LLP

(57) ABSTRACT

Automated systems and methods for processing substrates are described. An automated processing system includes: a vacuum chamber; a substrate support located inside the vacuum chamber and constructed and arranged to support a substrate during processing; and a substrate alignment detector constructed and arranged to detect if the substrate is misaligned as the substrate is transferred into the vacuum chamber based upon a change in a physical condition inside the system. The substrate alignment detector may include a vibration detector coupled to the substrate support. A substrate may be transferred into the vacuum chamber. The position of the substrate may be recorded as it is being transferred into the vacuum chamber. Misalignment of the substrate with respect to the substrate support may be detected. The substrate may be processed. The processed substrate may be unloaded from the vacuum chamber. The position of the processed substrate may be recorded as it is being unloaded from the vacuum chamber. Any substrate misalignment may be compensated for based upon the difference in the recorded substrate positions.

29 Claims, 16 Drawing Sheets

U.S. PATENT DOCUMENTS

| | | |
|---|---|---|
| 5,117,121 | 5/1992 | Watanabe et al. . |
| 5,194,743 | 3/1993 | Aoyama et al. . |
| 5,208,648 | 5/1993 | Batchelder et al. . |
| 5,222,329 | 6/1993 | Yu . |
| 5,275,683 | 1/1994 | Arami et al. . |
| 5,319,216 | 6/1994 | Mokuo et al. . |
| 5,325,261 | 6/1994 | Horwitz . |
| 5,332,352 | 7/1994 | Poduje et al. . |
| 5,352,294 * | 10/1994 | White et al. . |
| 5,378,994 | 1/1995 | Novak et al. . |
| 5,382,311 | 1/1995 | Ishikawa et al. . |
| 5,436,790 | 7/1995 | Blake et al. . |
| 5,466,945 * | 11/1995 | Brickell et al. ............ 414/935 |
| 5,483,138 | 1/1996 | Shmookler et al. . |
| 5,508,527 * | 4/1996 | Kuroda et al. . |
| 5,518,593 | 5/1996 | Hosokawa et al. ......... 204/192.12 |
| 5,535,306 * | 7/1996 | Stevens . |
| 5,537,311 * | 7/1996 | Stevens . |
| 5,539,323 | 7/1996 | Davis, Jr. . |
| 5,540,098 | 7/1996 | Ohsawa . |
| 5,547,539 | 8/1996 | Arasawa et al. . |
| 5,556,147 | 9/1996 | Somekh et al. . |
| 5,563,798 * | 10/1996 | Berken et al. . |
| 5,567,476 | 10/1996 | Law et al. ................. 427/255.7 |
| 5,606,251 | 2/1997 | Ryle et al. . |
| 5,607,602 | 3/1997 | Su et al. .......................... 216/76 |
| 5,611,865 | 3/1997 | White et al. ................... 118/725 |
| 5,622,693 | 4/1997 | Funatsu . |
| 5,654,508 | 8/1997 | Gibbs . |
| 5,690,744 * | 11/1997 | Landau . |
| 5,948,986 | 9/1999 | Brown . |

\* cited by examiner

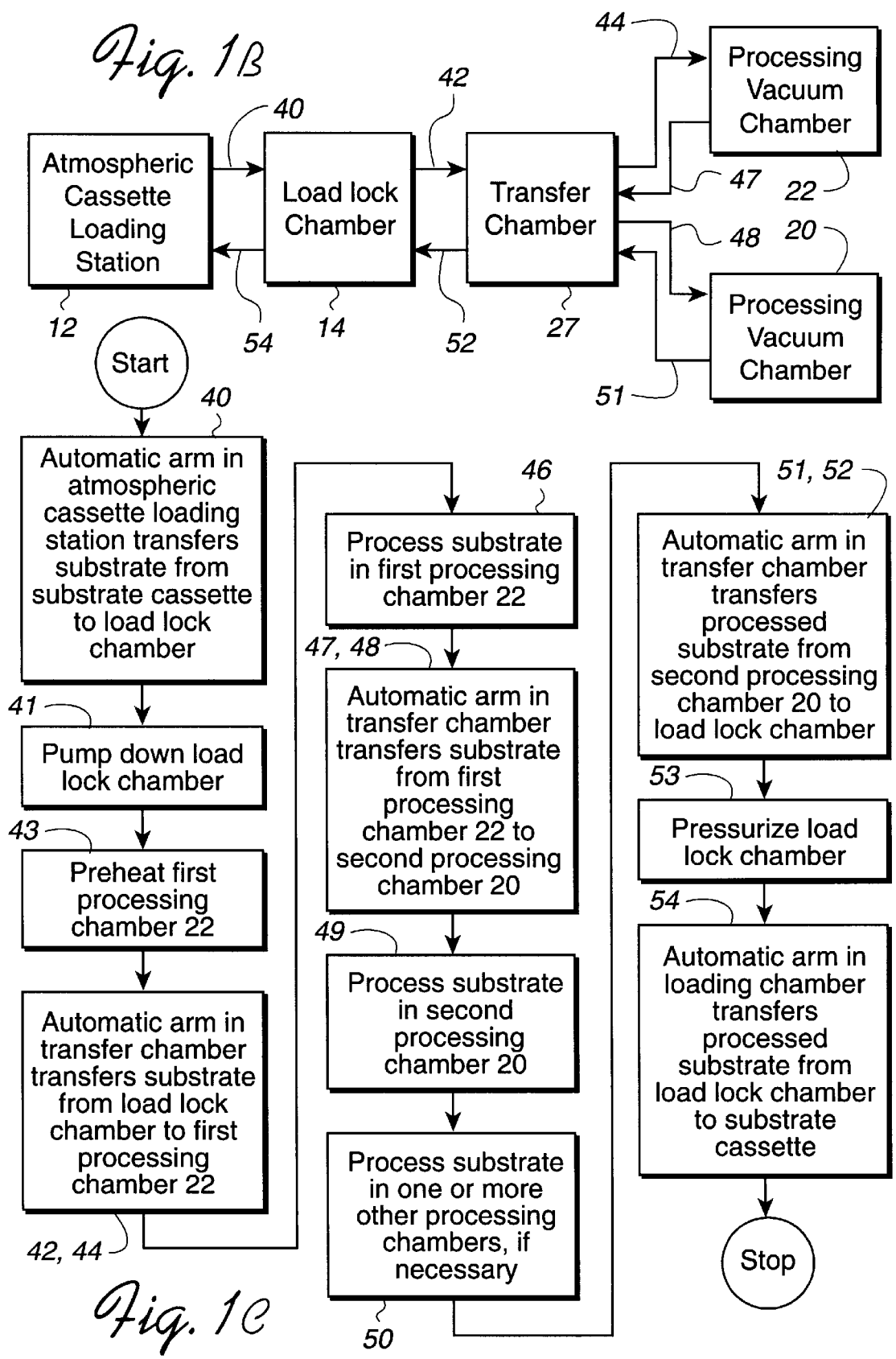

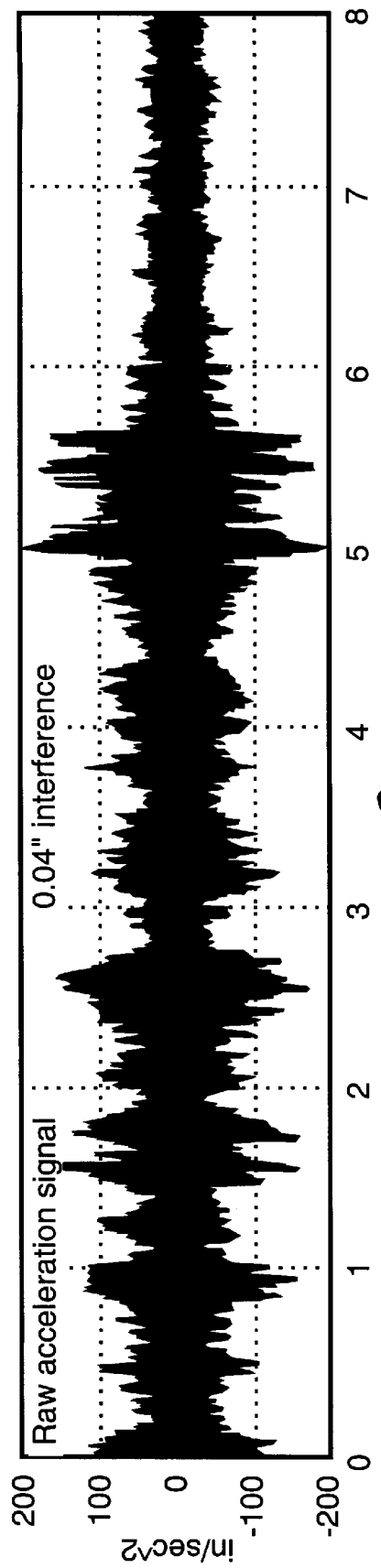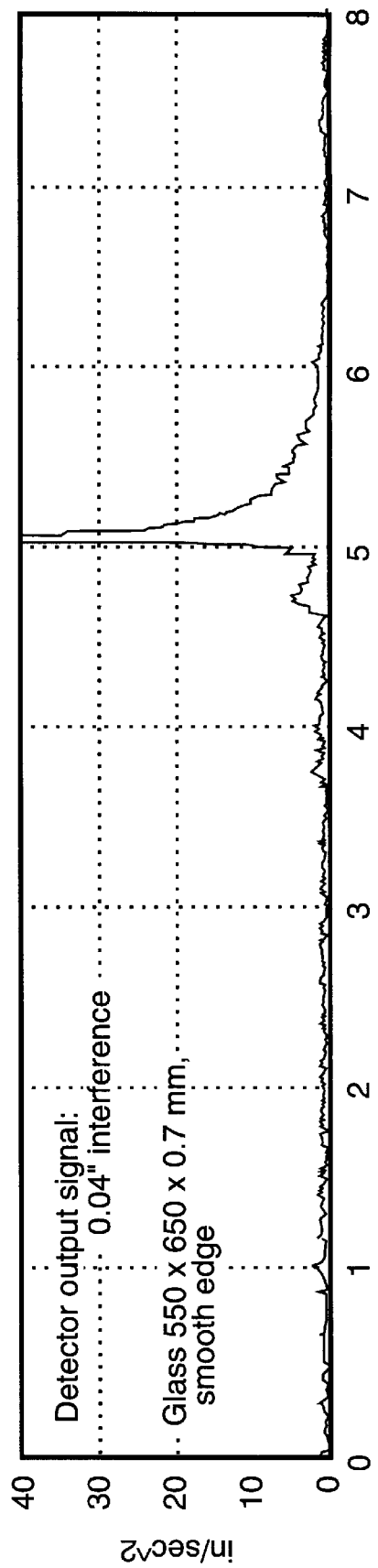

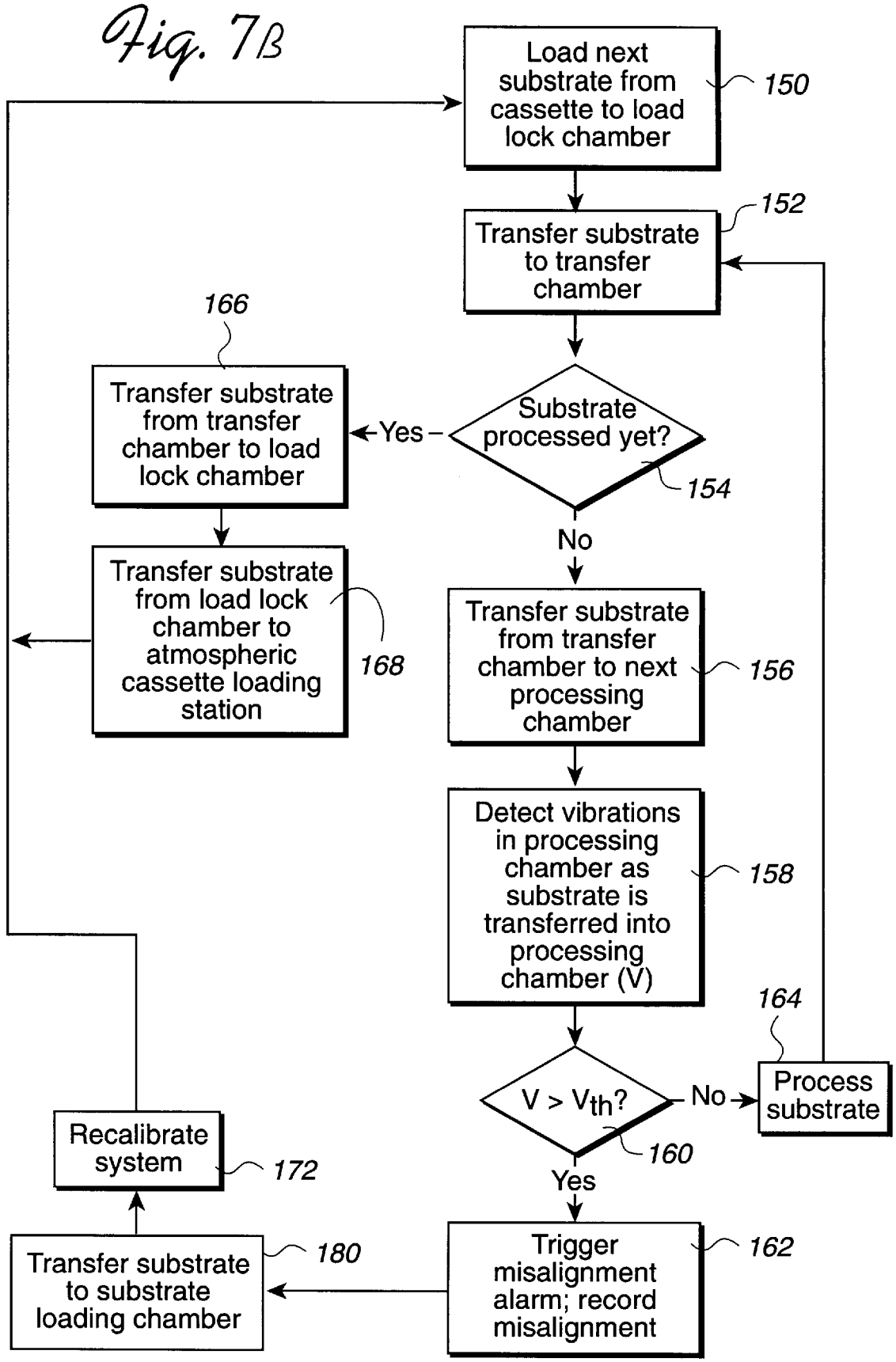

AUTOMATED SUBSTRATE PROCESSING SYSTEMS AND METHODS

This application is a continuation of copending application Ser. No. 08/949,207 filed Oct. 10, 1997.

BACKGROUND OF THE INVENTION

The invention relates to automated substrate processing systems and methods.

An automated substrate processing system typically includes a vacuum chamber with a support mechanism for supporting a substrate during processing, and an automated transfer mechanism, such as a robotic device. In operation, the transfer mechanism loads and unloads substrates into and out of the vacuum chamber. Over time, substrates may become misaligned with respect to the processing system. Significant substrate misalignment may reduce the number of devices that can be formed on a particular substrate or may cause the substrate to break inside the vacuum chamber. When a substrate breaks inside a vacuum chamber, the chamber must be opened and exposed to atmospheric pressure, the chamber must be cleaned, and the chamber must be pumped back down to a sub-atmospheric pressure suitable for processing. Such a procedure may take up to twenty-four hours to complete, significantly delaying the time during which the system can be used to process substrates.

SUMMARY OF THE INVENTION

In one aspect, the invention features a system for processing substrates, comprising: a vacuum chamber; a substrate support located inside the vacuum chamber and constructed and arranged to support a substrate during processing; and a substrate alignment detector constructed and arranged to detect if the substrate is misaligned as the substrate is transferred into the vacuum chamber based upon a change in a physical condition inside the system.

Embodiments may include one or more of the following features.

The substrate alignment detector may comprise a vibration detector coupled to the substrate support. The vibration detector may comprise an accelerometer or an optical sensor for detecting the position of the substrate. The alignment detector may be constructed to produce a signal indicative of the degree of substrate misalignment. A monitor may be coupled to the alignment detector and configured to trigger and alarm when the signal produced by the alignment detector exceeds a threshold vector. A controller may be provided for determining if the substrate is misaligned and for recalibrating the system.

A substrate aligner having one or more alignment pins for aligning the substrate with respect to the substrate support may be provided. The substrate aligner may be movable toward and away from a substrate that is positioned inside the vacuum chamber, and the one or more alignment pins are positioned to contact a substrate that is misaligned with respect to the substrate support and to guide the misaligned substrate into alignment. The substrate aligner may comprise one or more lift pins for supporting a substrate above the substrate support. A vibration detector may be provided for determining if a substrate contacts one or more of the alignment pins of the substrate aligner. The substrate alignment detector may be configured to determine which of the one or more alignment pins contacts the substrate. The substrate alignment detector may comprise three vibration detectors positioned at non-collinear locations with respect to the substrate aligner.

In another aspect, the invention features a method for processing substrates, comprising: transferring a substrate into a vacuum chamber that has a substrate support for supporting a substrate during processing; and detecting if the substrate is misaligned with respect to the substrate support by detecting vibrations inside the vacuum chamber.

Embodiments may include one or more of the following features. The substrate may be processed and unloaded from the vacuum chamber. The substrate may be determined to be misaligned with respect to the substrate support when the amplitude of the detected vibrations exceeds a threshold value. The system may be recalibrated after the substrate is determined to be misaligned with respect to the substrate support. The system may be recalibrated by: recording the position of the unprocessed substrate as it is being transferred into the vacuum chamber; recording the position of the processed substrate as it is being unloaded from the vacuum chamber; and compensating for any substrate misalignment based upon the difference in the recorded substrate positions. The system may be recalibrated by determining the magnitude (R) and direction ($\phi$) of substrate misalignment, and compensating for any substrate misalignment as the substrate is being transferred into the vacuum chamber based upon R and $\phi$.

In another aspect, the invention features a method for processing substrates, comprising: transferring a substrate into a vacuum chamber that has a substrate support for supporting a substrate during processing, recording the position of the substrate as it is being transferred into the vacuum chamber; detecting if the substrate is misaligned with respect to the substrate support; processing the substrate; unloading the processed substrate from the vacuum chamber; recording the position of the processed substrate as it is being unloaded from the vacuum chamber; and compensating for any substrate misalignment based upon the difference in the recorded substrate positions.

Among the advantages of the invention are the following. The invention can significantly reduce the substrate breakage rate by detecting when a substrate is likely to be misaligned. This increases the timing during which substrates can be processed, and increases the throughput rate and the processing yield. Furthermore, the invention can significantly improve the quality of the substrate process by reducing the number of times the system must be opened and exposed to atmospheric conditions.

Other features and advantages of the invention will become apparent from the following description, including the drawings and claims.

BRIEF DESCRIPTION OF THE DRAWINGS

FIG. 1B is a block diagram illustrating an example of substrate movement through the substrate processing system of FIG. 1A.

FIG. 1C is a flow diagram of an example of a method of processing a substrate in the substrate processing system of FIG. 1A.

FIG. 6A is a plot of the signal produced by the vibration detector shown in FIG. 5 as a substrate is being loaded into a vacuum chamber.

FIG. 6B is a plot of the signal of FIG. 6A after being filtered by the noise filter shown in FIG. 5.

FIGS. 7A and 7B are flow diagrams of methods of processing substrates.

DETAILED DESCRIPTION

Figure 1A:
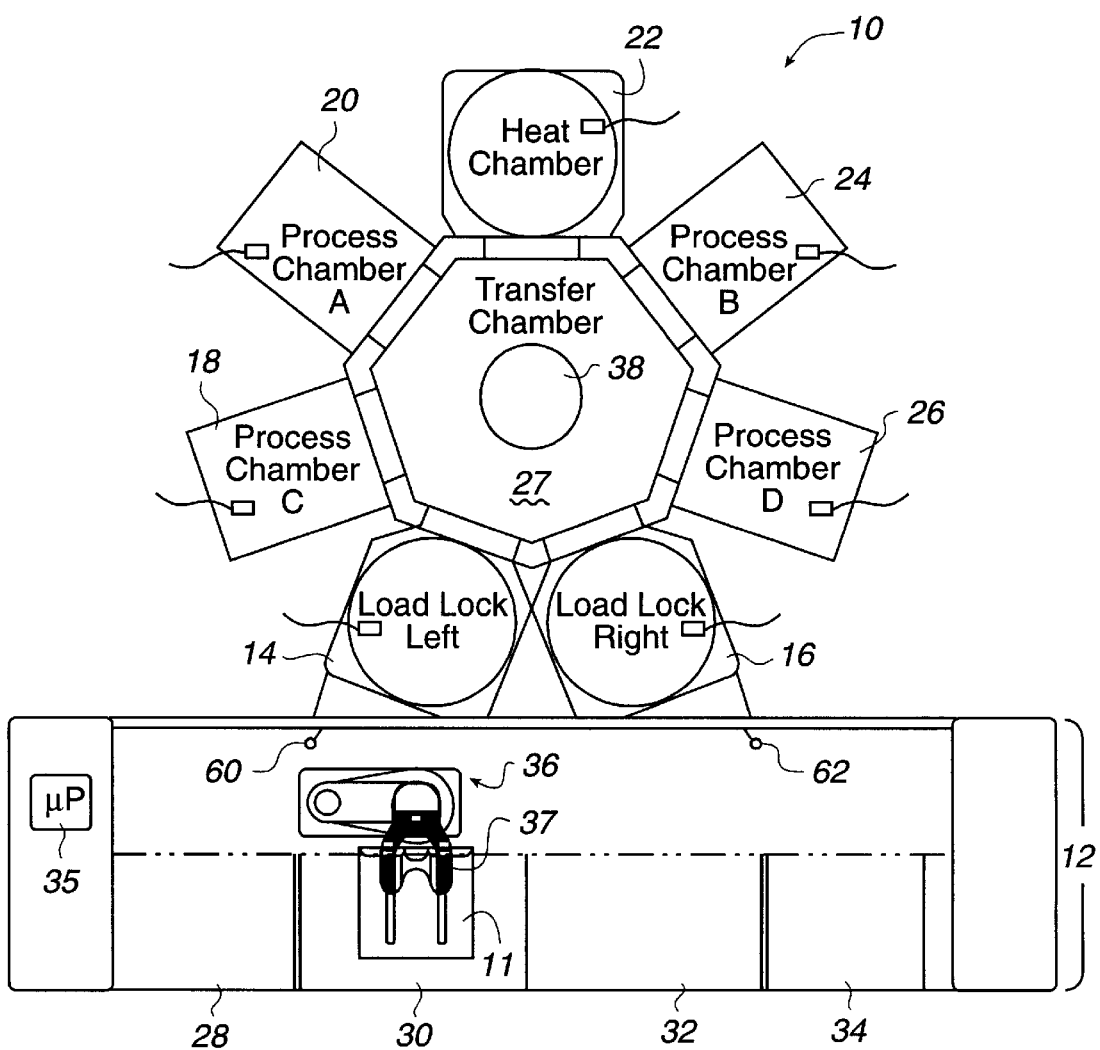
FIG. 1A is a diagrammatic top view of a substrate processing system that includes a loading chamber, a transfer chamber, and a plurality of processing chambers.

Referring to FIG. 1A, a system 10 for processing a substrate 11 includes a atmospheric cassette load station 12, two load lock chambers 14 and 16, five substrate processing chambers 18–26 (e.g., a physical vapor deposition (PVD) chamber, a chemical vapor deposition (CVD) chamber, a pre-heat chamber, and an etch chamber), and a transfer chamber 27. Atmospheric cassette load station 12 includes an automatic atmospheric transfer arm 36 and four substrate cassettes 28–34 which contain processed and unprocessed substrates. Transfer chamber 27 includes an automatic vacuum transfer arm 38 for transferring substrates into and out of load lock chambers 14, 16 and processing chambers 18–26. In operation, atmospheric cassette load station 12 is at atmospheric pressure and each of the processing chambers 18–26 is maintained at a sub-atmospheric pressure. Load lock chambers 14, 16 are at atmospheric pressure when a substrate is being transferred to or from atmospheric cassette load station 12, and they are at a sub-atmospheric pressure when a substrate is being transferred to or from transfer chamber 27. Atmospheric transfer arm 36 can slide back and forth along a linear track inside atmospheric cassette load station 12. Atmospheric transfer arm 36 also includes a transfer head 37 with three arm segments which can be rotated about three pivot axes to controllably position substrate 11 in a load lock chamber with high accuracy. Transfer head 37 can also move up and down, as indicated by the double-headed arrow shown in FIG. 2A. The position and orientation of atmospheric transfer arm 36 is recorded and controlled by microprocessor-based controller 35.

Referring to FIGS. 1B and 1C, in one embodiment which may be used in a liquid crystal display (LCD) fabrication process, a glass substrate may be processed in system 10 as follows. Atmospheric transfer arm 36 transfers the substrate from atmospheric cassette load station 12 to load lock chamber 14 (step 40). The load lock chamber is pumped down to a pressure of about $10^{-5}$ Torr (step 41). First processing chamber 22 is pre-heated (step 43). Vacuum transfer arm 38 unloads the substrate from load lock chamber 14 (step 42) and transfer the substrate to processing chamber 22 (step 44). Processing chamber 22 is pumped down to a pressure of about $10^{-8}$ Torr and the substrate is preheated to an initial process temperature of about 200–400° C. (step 46). Vacuum transfer arm 38 unloads the substrate from processing chamber 22 (step 47) and transfers the substrate to another processing chamber, such as chamber 20, for final processing (step 48). Processing chamber 22 is pumped down to a pressure of about $10^{-8}$ Torr and the substrate is processed by depositing a layer of titanium, aluminum, chromium, tantalum, indium-tin-oxide (ITO), or the like, on the substrate (step 49). The substrate may be processed in one or more other processing chambers, if necessary (step 50). After the substrate is finally processed, vacuum transfer arm 38 unloads the substrate from processing chamber 20 (step 51) and transfers the substrate to load lock chamber 14 (step 52). Load lock chamber 14 is pressurized back to atmospheric pressure (step 53). Atmospheric transfer arm 36 then transfers the substrate from load lock chamber 14 to a cassette in atmospheric cassette load station 12 (step 54).

Each time a substrate is automatically transferred from one chamber to another, the substrate may become misaligned with respect to the components inside the processing chamber. In general, alignment errors accumulate as the substrate is transferred through processing system 10. If the degree of misalignment is too great, the quality of the processed substrate might be significantly degraded, or the substrate might break. To avoid significant substrate misalignment, processing system 10 includes one or more substrate alignment detectors for determining when a substrate is likely to be sufficiently misaligned with respect to a component of processing system 10 that the system should be recalibrated. The alignment detectors also provide information relating to the orientation and magnitude of any misalignment; this information can be used to automatically recalibrate the system.

Figure 2A:
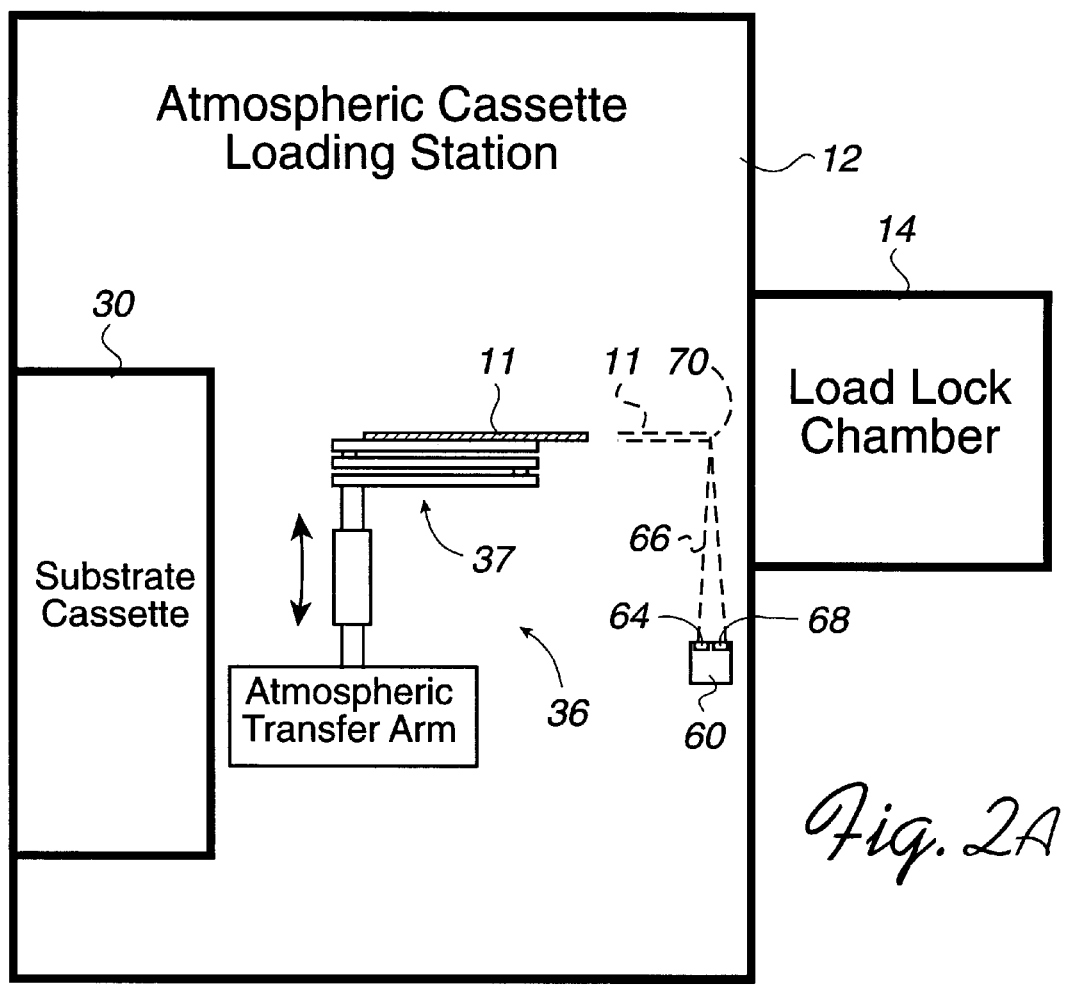
FIG. 2A is a diagrammatic front view of the loading chamber shown in FIG. 1A, including a plurality of substrate cassettes and an automatic atmospheric transfer arm.

Referring back to FIG. 1A and FIGS. 2A and 2B, atmospheric cassette load station 12 includes a plurality of substrate alignment detectors for monitoring the alignment of a substrate with respect to one or more components of processing system 10. Alignment detectors 60 and 62 are positioned adjacent to load lock chambers 14 and 16, respectively. As shown in FIG. 2A, alignment detector 60 includes a light source 64 (e.g., a laser) for producing a light beam 66 and a photodetector 68 (e.g., photodiode). As atmospheric transfer arm 36 carries substrate 11 from cassette 30 toward load lock chamber 14 (shown in shadow), a leading edge 70 of substrate 11 will cross the path of light beam 66 and cause light beam 66 to reflect back toward alignment detector 60. The position of atmospheric transfer arm 36 and the size of substrate 11 are known in advance. This information is used to determine a reference time when leading edge 70 of substrate 11 should cross the path of beam 66 if substrate 11 and atmospheric transfer arm 36 are properly aligned. Alignment detector 60 is used to determine if substrate 11 is likely to be misaligned based upon the time at which light beam 66 is first detected by photodetector 68.

If beam 66 is detected before the predetermined reference time, substrate 11 is likely to be displaced relative to the predetermined aligned position in a direction away from atmospheric transfer arm 36. If beam 66 is detected after the predetermined reference time, substrate 11 is likely to be displaced relative to the predetermined aligned position in a direction toward atmospheric transfer arm 36.

Figure 2B:
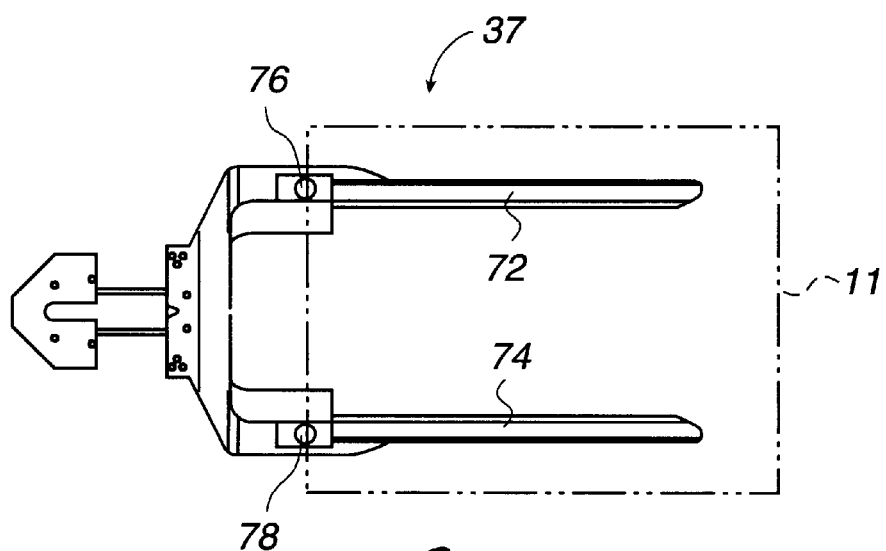
FIG. 2B is a diagrammatic top view of a transfer head of the automatic atmospheric transfer arm shown in FIG. 2A.

As shown in FIG. 2B, transfer head 37 of atmospheric transfer arm 36 includes two thin support blades 72, 74 for supporting substrate 11. Transfer head 37 also includes two alignment detectors 76, 78 mounted at the proximal ends of support blade 72, 74. Alignment detectors 76, 78 are of similar in construction to detectors 60, 62 (FIG. 1A) and each includes a light source (e.g., a laser) for producing a light beam and a photodetector (e.g., a photodiode) for detecting the light beam when it reflects from the bottom surface of substrate 11. Alignment detectors 76, 78 are used to determine if substrate 11 is rotationally misaligned with respect to transfer head 37. If the photodetector of one of the alignment detectors detects reflected light and the photodetector of the second alignment detector does not detect any reflected light, substrate 11 is likely to be rotated in the direction of the first alignment detector. For example, as shown in FIG. 2B, substrate 11 is rotated relative to the properly aligned position in the direction of alignment detector 76 (counter-clockwise) and, consequently, substrate 11 cross the path of the light beam produced by alignment detector 76 but doe not cross the path of the light beam produced by alignment detector 78. Alignment detectors 76, 78 can also be used to determine the direction along which substrate 11 is misaligned with respect to transfer head 37. For example, if substrate 11 cross the path of the light beams produced by both alignment detectors 76, 78, substrate 11 is likely to be displaced from the properly aligned position in a direction toward atmospheric transfer arm 36.

As described in detail below, controller 35 (FIG. 1A) receives the information from alignment detectors 60, 62 and 76, 78 relating to the position of substrate 11 and uses this information to recalibrate atmospheric transfer arm 36 and thereby compensate for any misalignment of substrate 11. Using this arrangement of alignment detectors, atmospheric transfer arm 36 has been observed to transfer into load lock chamber 14 glass substrates having a size of 600 mm by 720 mm with an accuracy of about ±0.5 mm.

Figure 3:
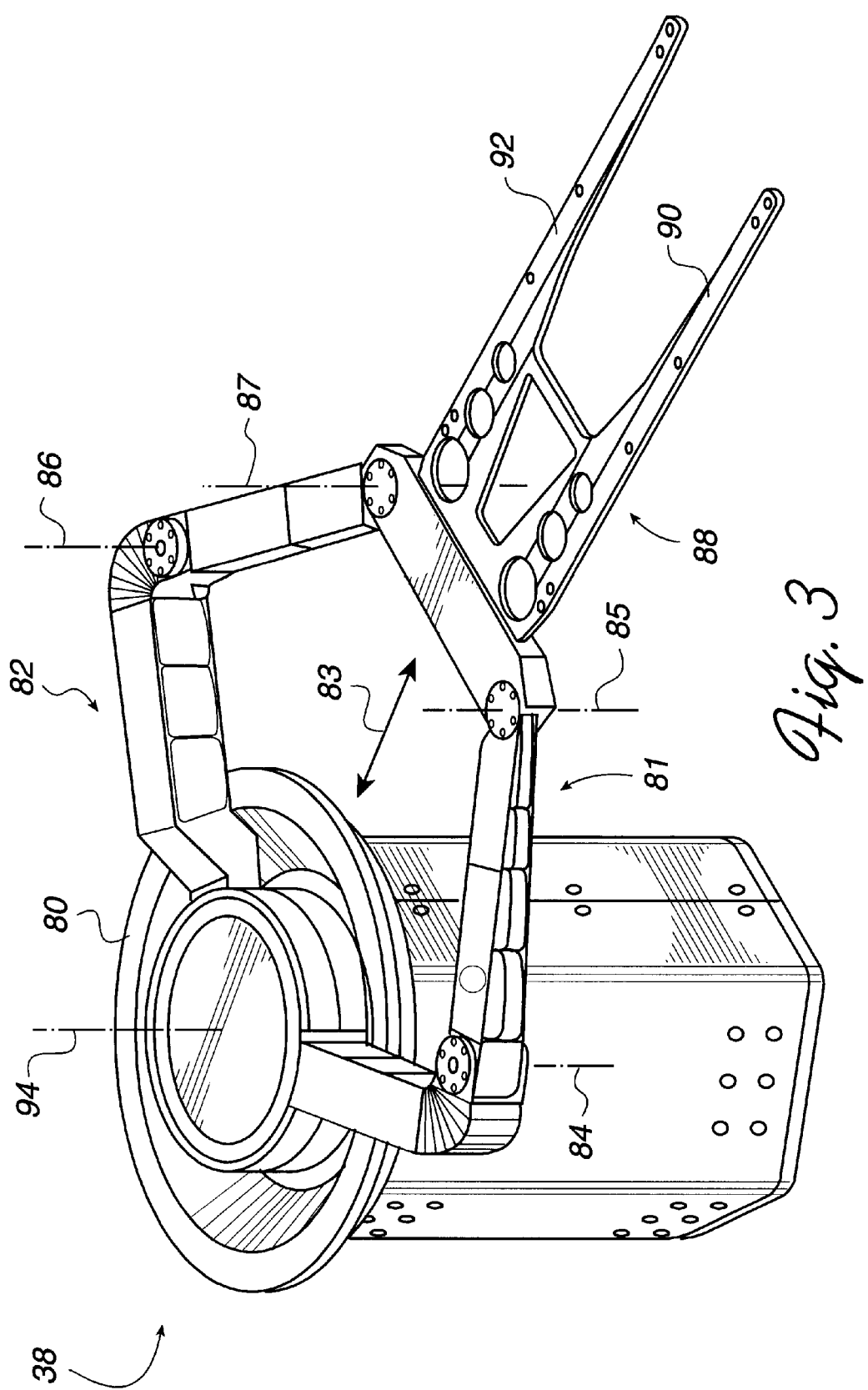
FIG. 3 is a diagrammatic front view of the transfer chamber shown in FIG. 1A, including an automatic vacuum transfer arm.

Referring to FIG. 3, vacuum transfer arm 38 has a base 80 that is sealed against the bottom of transfer chamber 27 and includes a pair of arms 81, 82 which can extend and retract as indicated by double-headed arrow 83 by pivoting about respective axes 84, 85 and 86, 87. Substrate 11 is supported on a support head 88 that includes two support blades 90, 92. Vacuum transfer arm 38 can also rotate about an axis 94.

Figure 4A:
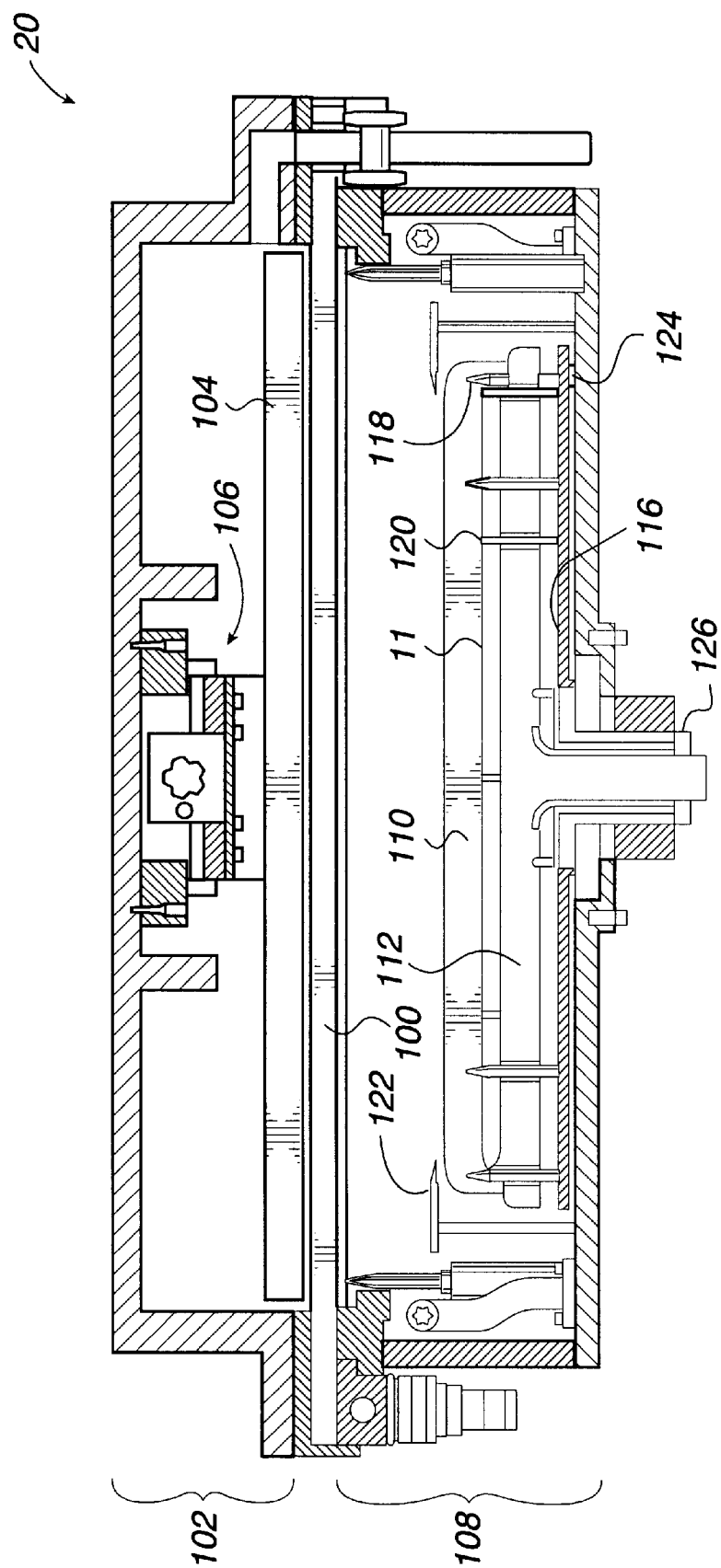
FIG. 4A is a diagrammatic cross-sectional side view of a substrate processing chamber that includes a substrate aligner and a substrate support.
Figure 4B:
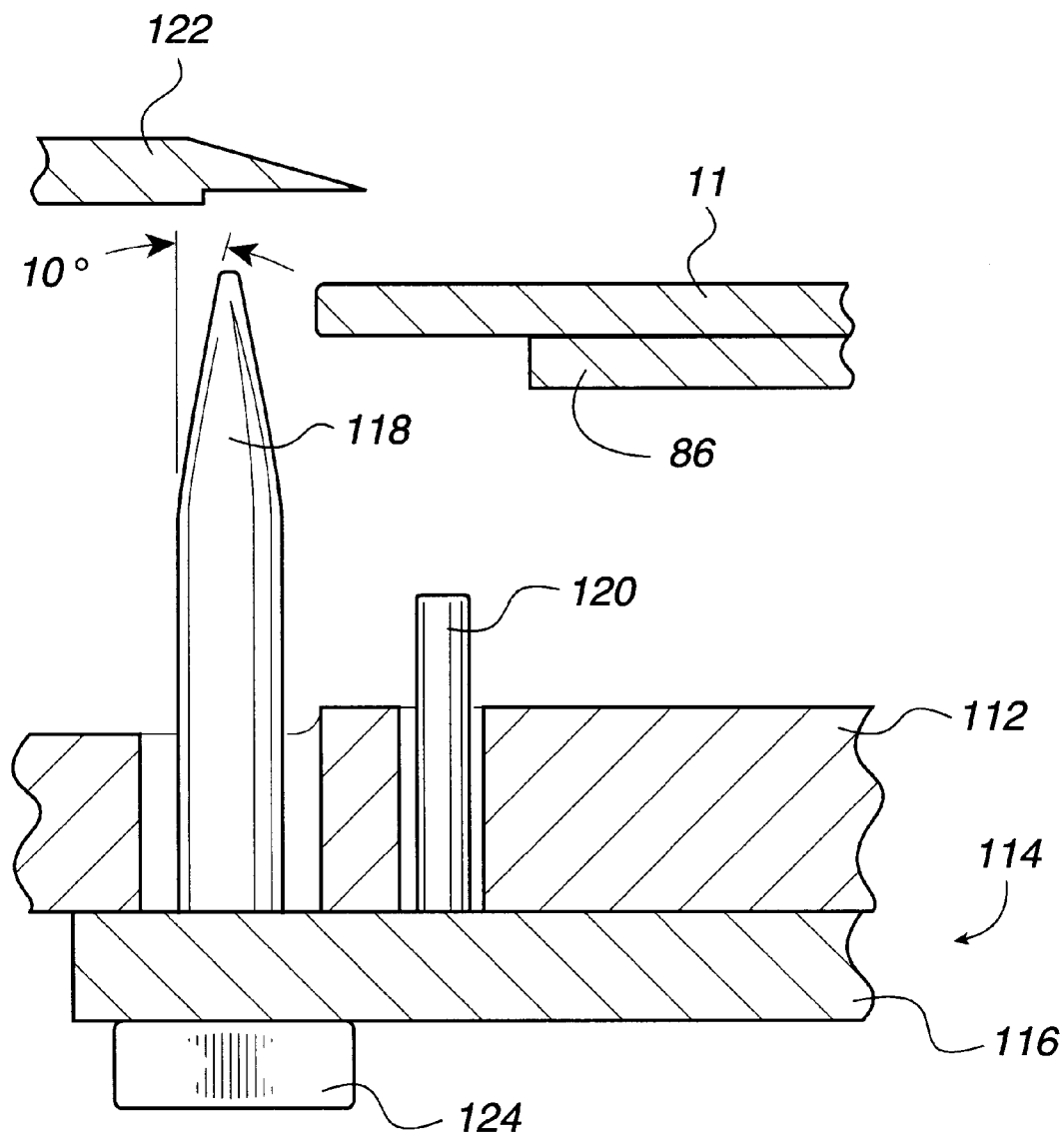
FIG. 4B is a diagrammatic side view of a substrate being transferred into the processing chamber of FIG. 4A.

Referring to FIGS. 4A and 4B, in one embodiment, processing chamber 20 is a physical vapor deposition (PVD) sputtering chamber which includes a target 100 formed from, e.g., titanium, aluminum, chromium, tantalum, indium-tin-oxide (ITO), and the like, a magnet chamber 102 containing a magnet assembly 104 and a magnet scanning mechanism 106, and a process chamber 108 which receives substrate 11 through a substrate port 110 (e.g., a slit valve). The target assembly may be filled with a coolant. The magnet chamber may alternatively be pumped down to a pressure that is substantially the same as the pressure inside substrate chamber 108. Magnet scanning mechanism 106 scans back and forth across magnet assembly 104 to assist in the sputtering process and to prevent uneven erosion of target 100. Process chamber 108 includes a susceptor (sputtering pedestal) 112 and a substrate 114 which includes a fin plate 116, a plurality of alignment pins 118 and a plurality of lift pins 120 that extend through holes in susceptor 112. A shadow frame 122 covers the edges of the substrate during processing to prevent sputter material from depositing on the edges or on the backside of substrate 11. Alignment detectors 124, 126 are used to determine if substrate 11 is likely to be misaligned with respect to shadow frame 122, as described in detail below. For related information see, e.g., U.S. Pat. No. 5,352,294, which is herein incorporated by reference.

Figure 4C:
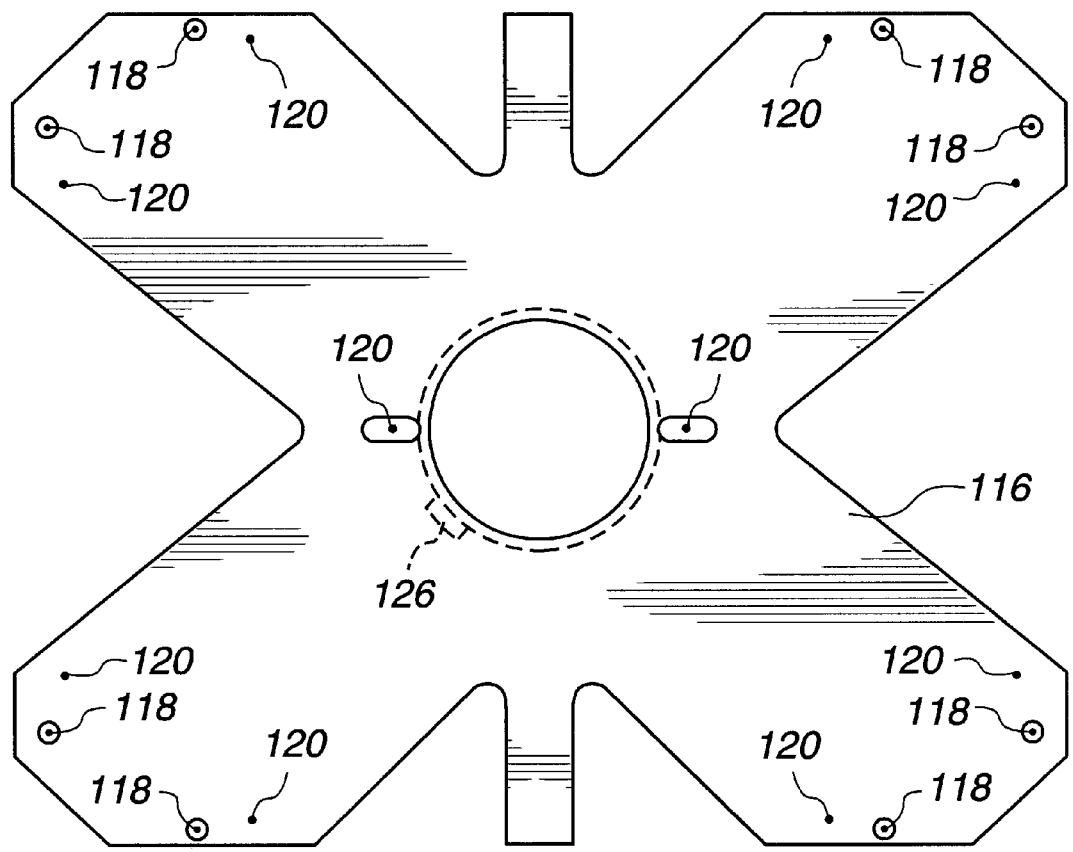
FIG. 4C is a diagrammatic top view of the substrate aligner shown in FIG. 4A.

Referring to FIG. 4C, alignment pins 118 are mounted to fin plate 116 at positions that are just beyond the outer edges of substrate 11. In one embodiment, the alignment pins are positioned so that there is approximately 0.02 inch clearance between the edges of substrate 11 and alignment pins when substrate 11 is properly aligned. The four alignment pins positioned near the end of the fin plate 116 that is farthest from port 110 are preferably longer than the four alignment pins positioned nearest to top port 110 so that it can readily clear the tops of the shorter alignment pins as substrate 11 is being transferred into and out of process chamber 108. Eight lift pins 120 are mounted to fin plate 116 at positions corresponding to the outer edges of substrate 11 and two lift pins 120 are mounted near the center of fin plate 116 to support the central portion of substrate 11. In one embodiment the short alignment pins extend about 2.83 inches above fin plate 116, the long alignment pins extend about 3.03 inches above fin plate 116, and both sets of alignment pins have tip regions with a taper of about 10° (FIG. 4B). The alignment pins are preferably made of a relatively hard material, such as stainless steel, and the lift pins are preferably made of a softer material, such as aluminum.

Figure 4D:
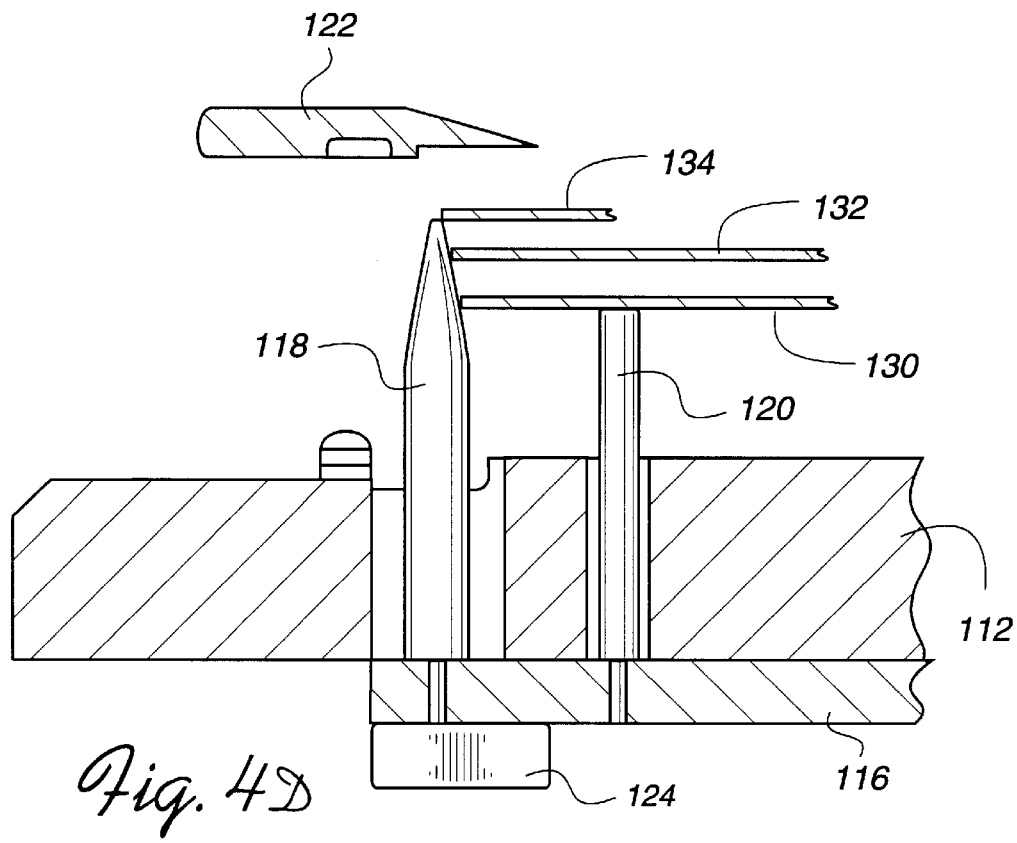
FIG. 4D is a diagrammatic side view of the substrate aligner and the substrate support shown in FIG. 4A positioned to unload a substrate from the automatic vacuum transfer arm shown in FIG. 3.
Figure 4E:
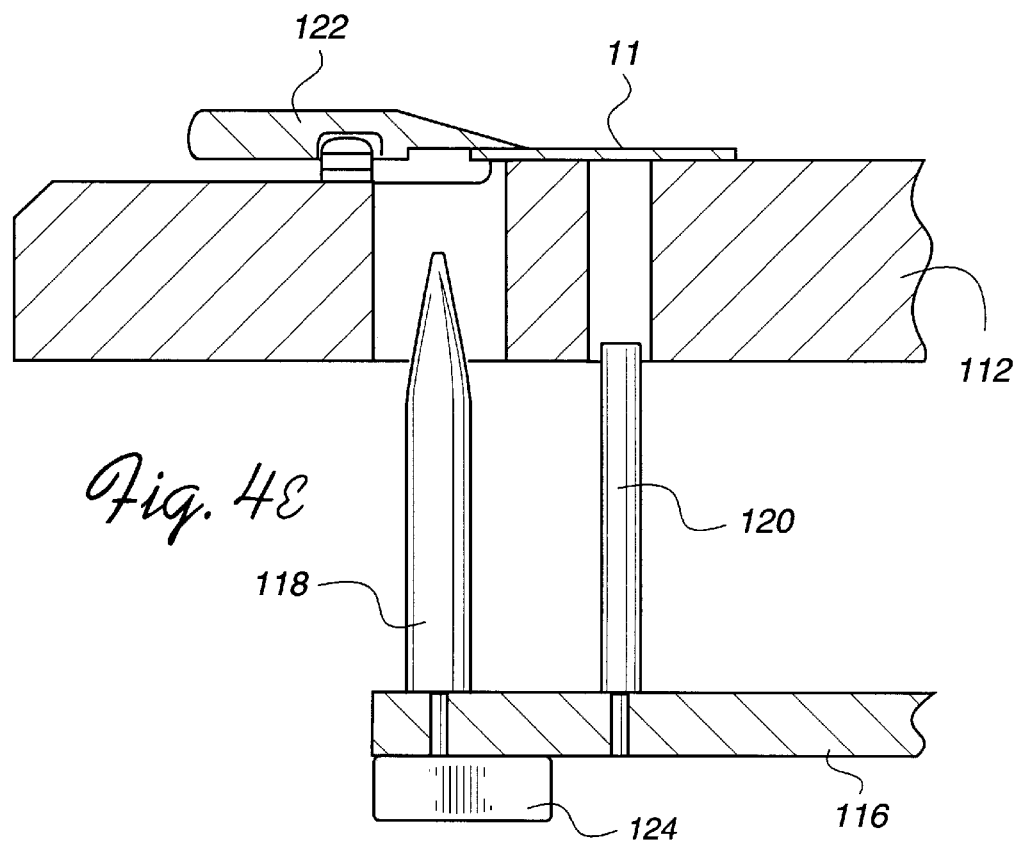
FIG. 4E illustrates the positions of the substrate aligner and the substrate support shown in FIG. 4A as a substrate is being processed.

Referring to FIGS. 4B, 4D and 4E, in operation, top segment 86 of vacuum transfer arm 38 transfers substrate 11 into processing chamber 108 through port 110 (FIG. 4A). When substrate 11 is positioned above susceptor 112 (FIG. 4B), susceptor 112 and fin plate 116 move together toward substrate 11 (FIG. 4D). If substrate 11 is properly aligned (substrate position 130), substrate 11 will not contact alignment pins 118 and will be supported above the segment 86 of vacuum transfer arm 38 by lift pins 120. If substrate 11 is slightly misaligned (substrate position 132), the edge of substrate 11 will contact one or more of alignment pins 118 and slide down the tapered sides of the tip regions of the alignment pins into position on lift pins 120. If substrate 11 is grossly misaligned (substrate position 134), substrate 11 will have up at the top of one or more of alignment pins 118 and will not come to rest on all of lift pins 120; in this case, there is a significant risk that substrate 11 will break during subsequent processing steps. After substrate 11 is positioned on lift pins 120 and transfer arm has been withdrawn from process chamber 108, fin plate 116 remains stationary while susceptor 112 continues to move up toward substrate 11 until the substrate is supported on susceptor 112 and the edges of substrate 11 are shielded by shadow frame 122 (FIG. 4E). Once substrate 11 is positioned under shadow frame 122, substrate 11 may be processed by sputtering target material onto the substrate surface.

Figure 5:
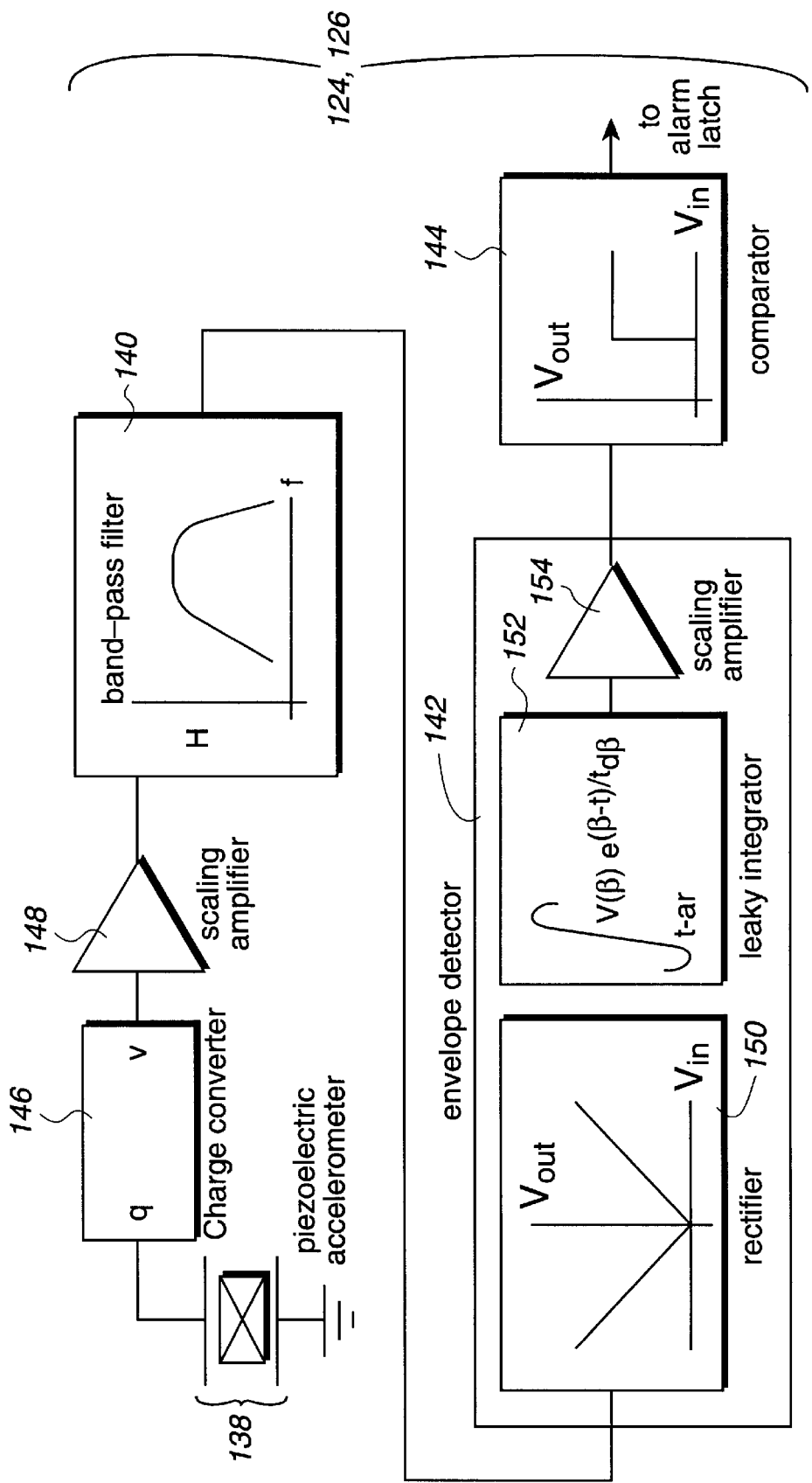
FIG. 5 is a diagrammatic view of a substrate alignment detector, including a vibration detector and a noise filter.

Referring back to FIGS. 4A, 4B, 4D–4E and 5, alignment detectors 124, 126 include vibration detectors 138 (e.g., an accelerometer available from Endevco Corporation of San Juan Capistrano, Calif., USA, model No. P/N 2221F) for detecting any impact and scraping of substrate 11 against one or more of the alignment pins 118. Alignment detector 124 is mounted to the underside of fin plate 116 near one of the alignment pins, and alignment detector 126 is mounted outside the vacuum chamber on the drive mechanism which moves fin plate 116 up and down. As shown in FIG. 5, the alignment detectors also include a noise filter 140, and envelope detector 142, and a comparator 144. A charge converter 146 converts the charge signals produced by accelerometer 138 into a voltage signal, which is amplified by a scaling amplifier 148. Noise filter 140 includes a band-pass filter which passes signals with frequencies that are substantially correlated with substrate impact and scraping against one or more of the alignment pins. It has been observed that background vibrations at the fin plate (caused by, e.g., the fin plate drive mechanism, cryopumps, and other PVD machinery) are largely confined to frequencies below about 2.0 kHz and that signal amplitude between about 2.0 kHz and 4.0 kHz provide a good indication of substrate contact between the substrate and one or more of the alignment pins. The low-pass section of the band-pass filter is provided by a 4.0 kHz analog antialiasing filter prior to digitizing at 10.24 kHz. Each detector 142 includes a rectifier 150, a leaky integrator 152, and a scaling amplifier 154. The signal produced by envelope detector 142 is unipolar (always positive) and varies more slowly than the signal produced by noise filter 140 and, therefore, has the same peak value as the noise filter signal but has a lower bandwidth, making it suitable for triggering a simple level alarm.

FIGS. 6A and 6B illustrate the signals produced at the output of accelerometer 138 of alignment detector 124 and at the output of envelope detector 142, respectively. These signals were obtained as a result of an experiment in which a glass substrate with a size of about 550 mm by 650 mm by 0.7 mm is misaligned so as to overlap with an alignment pin by about 0.04 inch, and in which the fin plate motor drive speed was about 22,222 encoder pulses per second. As shown in FIG. 6B, the substrate contacts the alignment pin at a time just before about 5 seconds and slides down the tapered edge of the alignment pin during the subsequent 0.25 second or so. It has been found that the noise spectrum resulting from fin plate drive mechanism depends upon the speed at which the drive is operated. Improved impact signal detection has been observed when the drive noise spectrum is shifted down below the high-pass section of the band-pass filter as a result of decreasing the fin plate drive speed. In one embodiment, an acceleration alarm threshold of about 21 in-sec$^{-2}$ has been found to be suitable for a fin plate drive motor speed of about 60,000 encoder pulses per second; suitable acceleration alarm thresholds would generally be lower at lower drive motor speeds. It has also been observed that the detector output is generally stronger for greater levels of interference between the substrate and the alignment pin even though the approach velocity between the substrate and the alignment pin is substantially the same. Without being limited to a particular theory, it is believed that the phenomena being detected is probably not the initial contact between the substrate and an alignment pin; rather it is vibration produced when the edge of the substrate slides down the tapered section of the alignment pin after being lifted by it, and when the substrate strikes the lift pins after sliding down the alignment pin.

The detection parameters of alignment detectors 124, 126 should be varied depending upon the characteristic properties of the substrate. For example, it has also been observed that the detectability of the signal varies with the bending stiffness of the substrate. Thick glass (e.g., about 1.1 mm) has almost four times the bending stiffness of thin glass (e.g., about 0.7 mm). If it contacts one of the alignment pins, thick glass will be lifted clear of one or more lift pins near the contacting alignment pin, whereas thin glass will simply flex to accommodate the edge lift but will not lose contact with the lift pin. Within this range of edge lift, thick glass can produce a sharp impact against a lift pin as it slides back down the alignment pin. Thin glass, on the other hand, may simply hang up on the alignment pin rather than sliding back down, producing a relatively small vibration that is more difficult to detect. The condition of the substrate edges also affects the detectability of contact between the substrate and the alignment pins. For example, sharp edge glass is generally lifted higher above the lift pins before sliding down the alignment pin than smooth edge glass; thus, misalignment of sharp edge glass generally produces greater vibrations, which are easier to detect, than smooth edge glass.

As mentioned above, information from the various alignment detectors can be used to determine when the substrate is misaligned with respect to the components of the processing system. When significant substrate misalignment is detected, the processing system can be temporarily shut down to enable one or more of the transfer arms to be recalibrated. This approach significantly reduces the likelihood that a substrate will break inside one of the vacuum chambers and, thereby, increases the time during which the system can be used to process substrates. If the alarm threshold is relatively low, substrate processing may continue after the alarm is triggered; if the alarm threshold is relatively high, substrate processing may be immediately terminated as soon as the alarm is triggered.

Figure 7A:
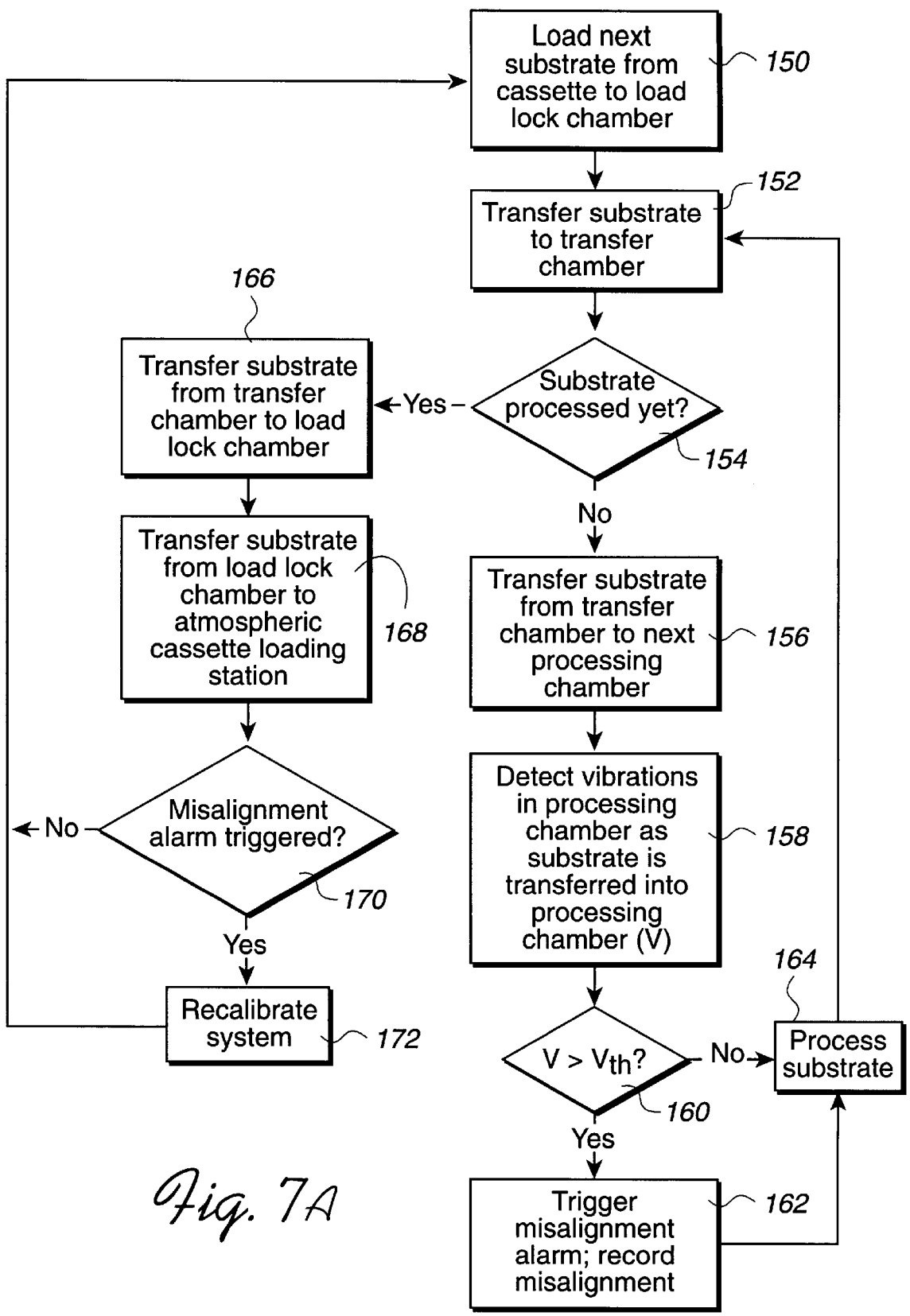

As shown in FIG. 7A, in one method of processing substrates, atmospheric transfer arm 36 transfers the next substrate to be processed from a substrate cassette to a load lock chamber (step 150). Vacuum transfer arm 38 unloads the substrate from the load lock chamber (step 152) and, if the substrate is not processed yet (step 154), vacuum transfer arm 38 transfers the substrate from transfer chamber 27 to the next processing chamber (step 156). Alignment detectors 124, 126 detect the magnitude of vibrations (V) resulting from the substrate being loaded into the processing chamber (step 158). If the magnitude of the detected vibrations is greater than a predetermined threshold (e.g., about 21 inch-sec$^{-2}$) (step 160), the misalignment alarm is triggered and a record is made that the system should be recalibrated (step 162). The substrate is then processed, whether or not the misalignment alarm has been triggered (step 164). Vacuum transfer arm 38 then unloads the substrate from the load lock chamber (step 152). If the substrate is not completely processed (step 154), vacuum transfer arm 38 transfers the substrate from transfer chamber 27 to the next processing chamber (step 156); otherwise, vacuum transfer arm 38 transfers the processed substrate to a load lock chamber (step 166) and atmospheric transfer arm 36 transfers the processed substrate to a substrate cassette in atmospheric cassette load station 12 (step 168). If the misalignment alarm was triggered (step 170), the system is recalibrated (step 172); otherwise the next substrate to be processed is loaded into the load lock chamber (step 150).

The processing method shown in FIG. 7B is similar to the method shown in FIG. 7A, except that the fabrication process is immediately terminated and the substrate is immediately transferred back to the atmospheric cassette load station (step 180) when the misalignment alarm is triggered (step 162) so that the system can be recalibrated (step 172).

Figures 8A, 8B:
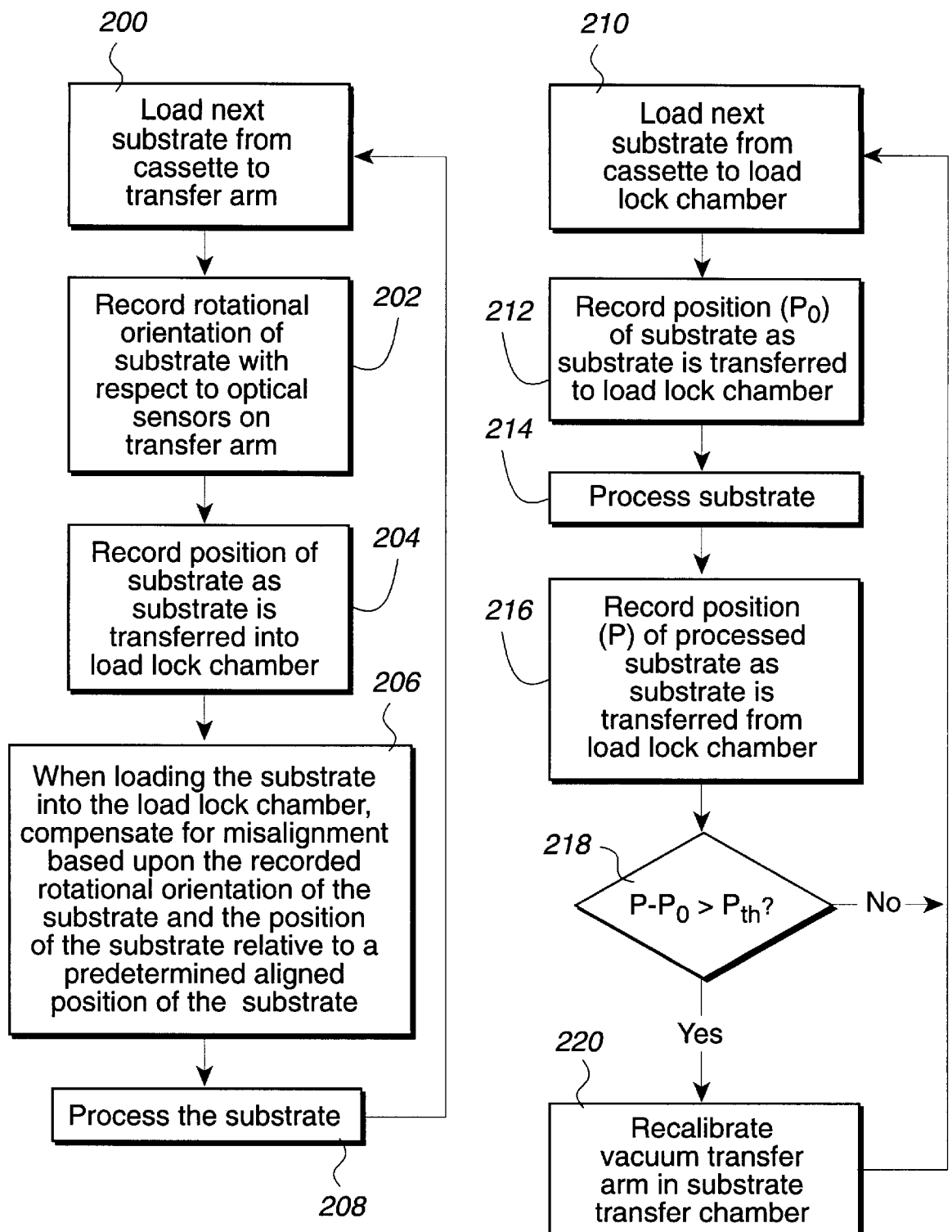
FIGS. 8A and 8B are flow diagrams of methods of recalibrating the substrate processing system of FIG. 1A.

FIG. 8A illustrates one method of recalibrating the processing system automatically. Atmospheric transfer arm 36 loads the next substrate to be processed from a cassette (step 200). The rotational orientation of the substrate with respect to atmospheric transfer arm 36 is recorded based upon the signals received from alignment detectors 76, 78 (step 202). The position of the substrate relative to the predetermined aligned position is recorded based upon the signals from one of the alignment detectors 60, 62 as the substrate is being loaded into the load lock chamber (step 204). Controller 35 (FIG. 1A) uses the recorded information to automatically compensate for any detected misalignment when loading the substrate into the load lock chamber (step 206); this compensation is achieved by adjusting the internal representation of the position of atmospheric transfer arm 36 correspond to the detected position. The substrate is then processed as described above (step 208). Using this arrangement of alignment detectors, atmospheric transfer arm 36 has been observed to transfer into load lock chamber 14 glass substrates 600 mm by 720 mm in area with an accuracy of about ±0.5 mm.

FIG. 8B illustrates another method of recalibrating the processing system that may be used alone or in combination with the recalibration method of FIG. 8A. Atmospheric transfer arm 36 transfers the next substrate to be processed from a cassette to one of the load lock chambers (step 210). The position ($P_0$; magnitude and direction) of the substrate is determined from information received from alignment detectors 76, 78 and 60 (or 62), and is recorded (step 212). The substrate is then processed (step 214). As the processed substrate is being unloaded from the load lock chamber, the position (P; magnitude and direction) of the substrate is determined from information received from alignment detectors 76, 78 and 60 (or 62), and is recorded (step 216). If the difference between P and $P_0$ is greater than a preselected threshold $P_{th}$ (e.g., about 0.02 inch to about 0.03 inch) (step 218), vacuum transfer arm 38 is recalibrated (step 220); otherwise, the next substrate is loaded into a load lock chamber (step 210). Thus, a difference between P and $P_0$ that is greater than $P_{th}$ triggers the recalibration of vacuum transfer arm 38.

Vacuum transfer arm 38 may be recalibrated in a variety of ways. For example, transfer chamber 27 may be temporarily brought up to atmospheric pressure and vacuum transfer arm 38 may be manually recalibrated. Vacuum transfer arm 38 may alternatively be automatically recalibrated based upon the magnitude and direction of misalignment as determined, e.g., by the method of FIG. 8B. For example, vacuum transfer arm 38 may iteratively recalibrated whereby for each substrate processing cycle, the difference between P and $P_0$ is fed back to the controller of vacuum transfer arm 38 and this information is used to automatically recalibrate vacuum transfer arm 38 based upon the assumption that all of the misalignment is attributable to the misalignment of vacuum transfer arm 38.

Figure 9:
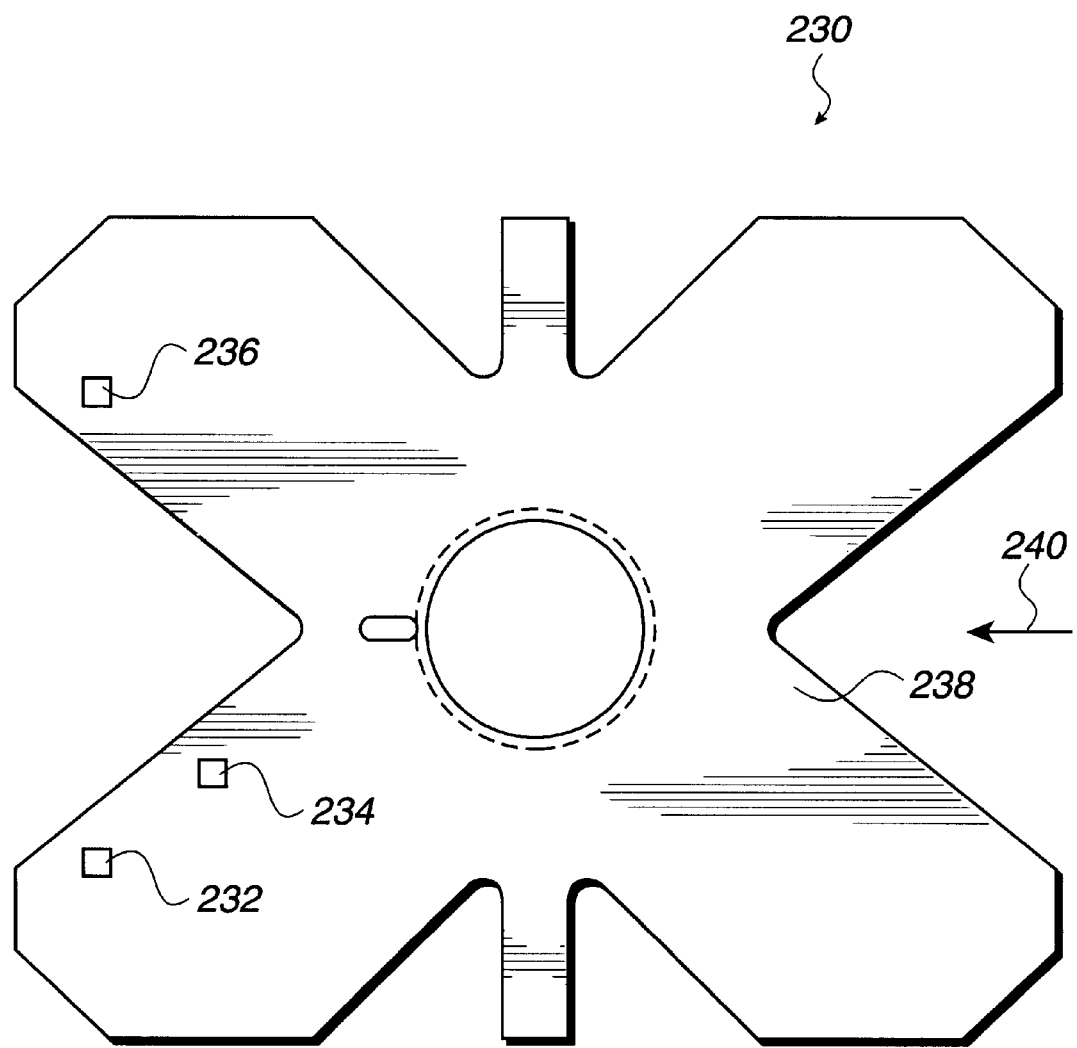
FIG. 9 is a diagrammatic bottom view of a substrate aligner and an alternative substrate alignment detector for use in a substrate processing chamber.

Referring to FIG. 9, one or more of the processing chambers may include a fin plate with an alignment detector that includes three vibration detectors 232, 234, and 236 mounted at three non-collinear locations on the backside of a fin plate 238. As a substrate is loaded into the processing chamber in the direction indicated by arrow 240, if the substrate contacts one or more of the alignment pins located on the top side of fin plate 238, vibrations will emanate from the contacted alignment pins and will be detected by vibration detectors 232, 234 and 236. Because the position of vacuum transfer arm 38 is known as it moves into the processing chamber, the time (reference time) at which an alignment pin might contact the substrate is substantially known in advance. Furthermore, because the vibration detectors are located at different positions with respect to the alignment pins, the time it takes for the contact-induced vibrations to be detected by vibration detectors 232, 234 and 236 can be used to determine which of the alignment pins contacts the substrate. For example, the delay between the reference time and the time contact-induced vibrations are detected by a vibration detector may provide a rough measure of the distance between the contacted alignment pin and the vibration detector. These rough distance determinations, together with information of the positions of the alignment pins with respect to the alignment detectors, can be used to determine which of the alignment pins contacts the substrate. The rotational misalignment ($\phi$) between the substrate and the transfer arm can be determined based upon which of the alignment pins is identified as having contacted substrate 11. This information can be used to recalibrate vacuum transfer arm 38.

Figure 10A:
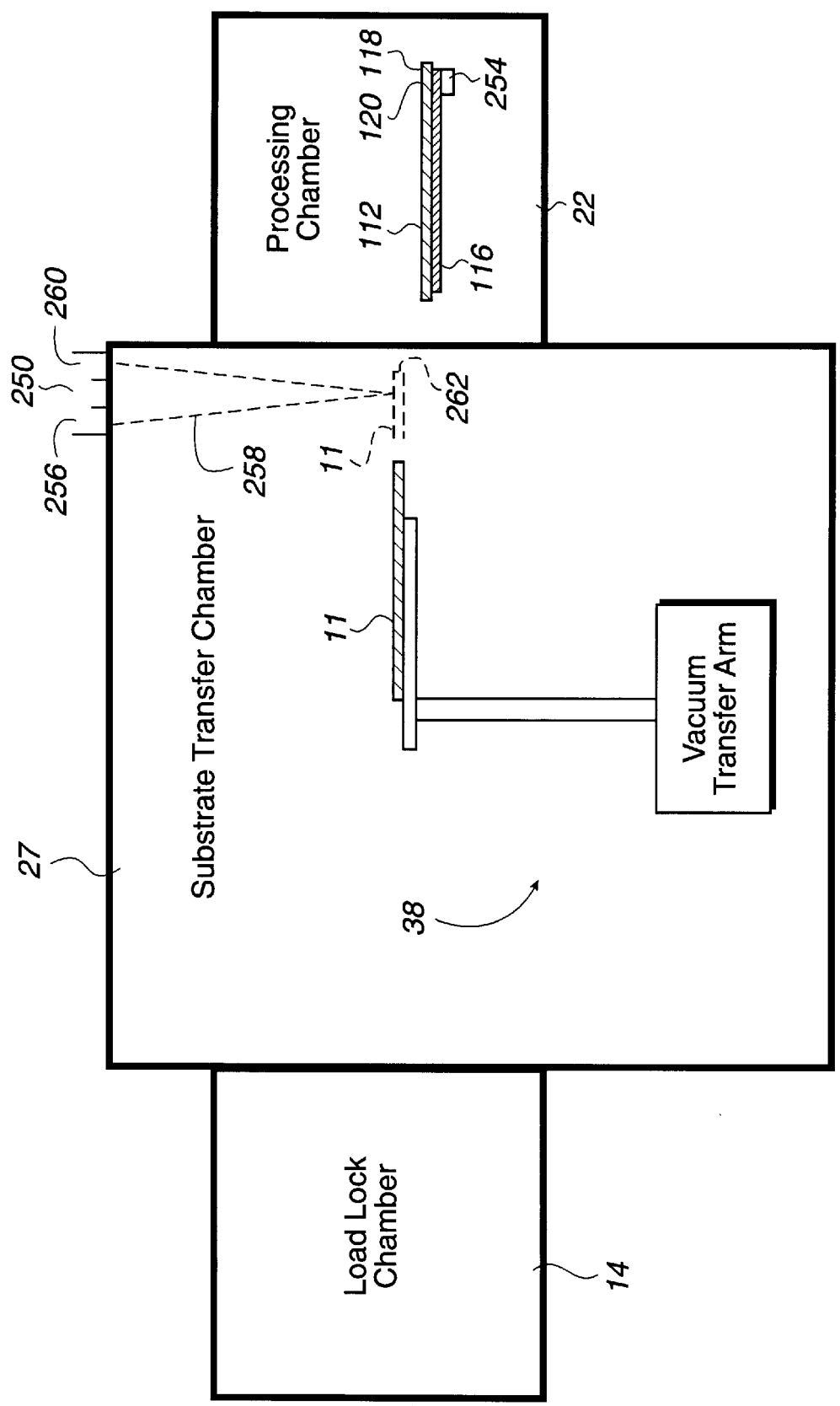
FIG. 10A is a diagrammatic side view of a substrate processing chamber, a substrate transfer chamber, and an alternative alignment detector arrangement for determining if the substrate is likely to be misaligned.

Referring to FIG. 10A, in another embodiment, alignment detectors 250 and 254 provide information relating to the position of substrate 11, information which can be used to recalibrate vacuum transfer arm 38. Alignment detector 250 includes a light source 256 (e.g., a laser) for producing a light beam 258 and a photodetector 260 (e.g., a photodiode). As vacuum transfer arm 38 carries substrate 11 toward processing chamber 22 (shown in shadow), a leading edge 262 of substrate 11 will cross the path of light beam 258 and cause light beam 258 to reflect back toward alignment detector 250. The position of vacuum transfer arm 38 and the size of substrate 11 are known in advance. This information is used to determine a reference time when leading edge 262 of substrate 11 should cross the path of beam 258 if substrate 11 and vacuum transfer arm 38 are aligned. Alignment detector 250 is used to determine if substrate 11 is likely to be misaligned and to determine the magnitude (R) of the misalignment based upon the time at which light beam 258 is first detected by photodetector 260. If beam 258 is detected before the predetermined reference time, substrate 11 is likely to be displaced relative to the predetermined aligned position in a direction away from vacuum transfer arm 38. If beam 258 is detected after the predetermined reference time, substrate 11 is likely to be displaced relative to the predetermined aligned position in a direction toward vacuum transfer arm 38. Alignment detector 254 includes a vibration detector positioned on the backside of fin plate 116 near one of the alignment pins. If the magnitude of the contact-induced vibrations detected by alignment detector 254 is greater than a predetermined threshold, the processing system may be recalibrated as described above. Also, the delay between the time when substrate 11 might contact one or more the alignment pins and the time contact-induced vibrations are detected by alignment detector 254 can be used to determine the distance between the contacted alignment pin and the vibration detector, information which, in turn, can be used to determine which of the alignment pins has contacted substrate 11. The rotational misalignment ($\phi$) between substrate 11 and vacuum transfer arm 38 can be determined based upon which of the alignment pins is identified as having contacted substrate 11. This information can be used to recalibrate vacuum transfer arm 38.

Figure 10B:
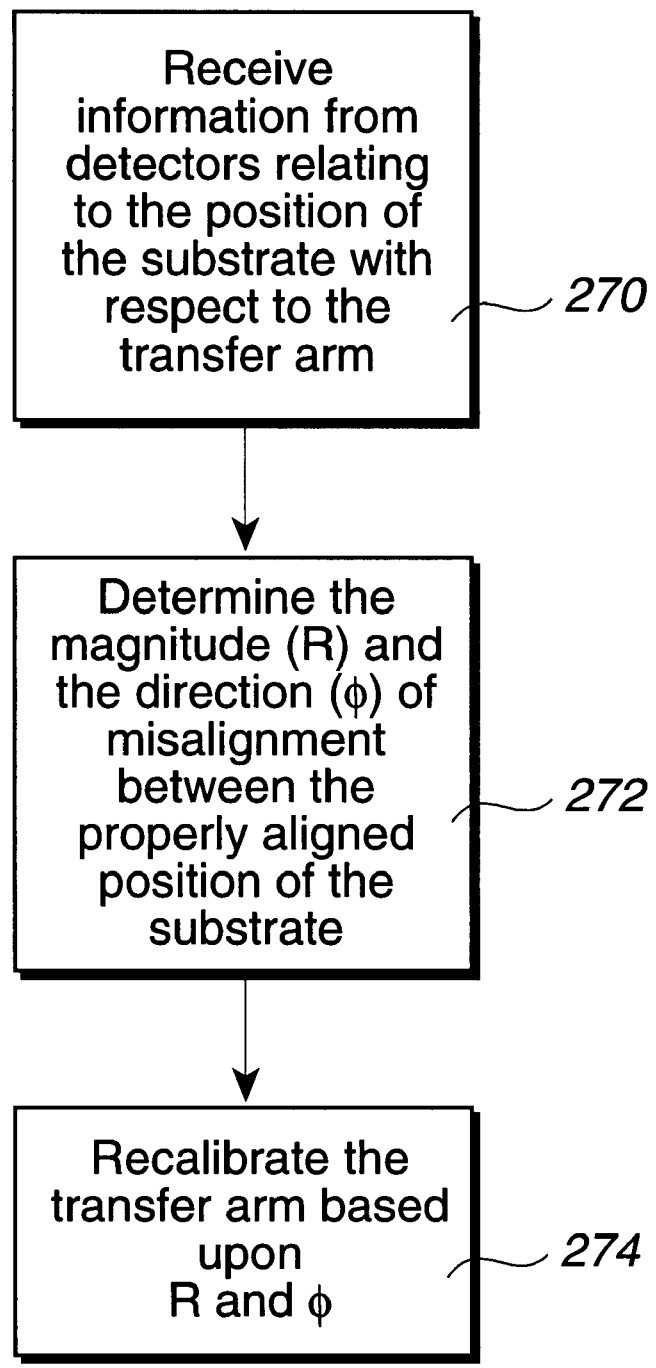
FIG. 10B is a flow diagram of a method of processing substrates.

Referring to FIG. 10B, vacuum transfer arm 38 may be recalibrated based upon the information provided by alignment detectors 250 and 254 (FIG. 10A) as follows. Information from alignment detectors 250 and 254 is received by a microprocessor controlling the operation of vacuum transfer arm 38 (step 270). The magnitude (R) and the direction ($\phi$) of substrate misalignment is determined (step 272). Vacuum transfer arm 38 is then recalibrated based upon R and $\phi$ (step 274). As described with respect to FIGS. 7A and 7B, vacuum transfer arm 38 may be recalibrated after substrate 11 has been processed, or vacuum transfer arm 38 may be recalibrated as soon as significant substrate misalignment has been detected. Vacuum transfer arm 38 may be manually recalibrated or iteratively recalibrated based upon continuous feedback from alignment detectors 250 and 254.

For related information refer to U.S. Pat. No. 5,535,306 and 5,537,311, which are herein incorporated by reference.

Still other embodiments are within the scope of the claims.

What is claimed is:

1. A system for processing a substrate, comprising:
   a vacuum chamber;
   a substrate support located inside the vacuum chamber and constructed and arranged to support a substrate during processing; and
   a substrate alignment detector constructed and arranged to detect if the substrate is misaligned as the substrate is transferred into the vacuum chamber based upon a non-optical signal received by the substrate alignment detector, wherein the non-optical signal is generated by the substrate contacting a structure in the vacuum chamber.

2. A system as in claim 1, wherein the non-optical signal is at least partially generated by the substrate sliding along a structure in the vacuum chamber.

3. A system for processing a substrate, comprising:
   a vacuum chamber;
   a substrate support located inside the vacuum chamber and constructed and arranged to support a substrate during processing; and
   a substrate alignment detector constructed and arranged to detect if the substrate is misaligned as the substrate is transferred into the vacuum chamber based upon a non-optical signal received by the substrate alignment detector, wherein said non-optical signal comprises an electrical signal and said electrical signal is generated in response to a mechanical force applied to a portion of said substrate alignment detector.

4. A system as in claim 3, wherein said generator of said substrate detector comprises a piezoelectric material.

5. A system for processing a substrate, comprising:
   a vacuum chamber;
   a substrate support located inside the vacuum chamber and constructed and arranged to support a substrate during processing; and
   a substrate alignment detector constructed and arranged to detect if the substrate is misaligned as the substrate is transferred into the vacuum chamber based upon a non-optical signal received by the substrate alignment detector, wherein an alignment pin transmits said non-optical signal in response to a mechanical force applied to said alignment pin by a substrate.

6. A substrate processing system comprising:
   a vacuum chamber;
   a substrate support in said vacuum chamber;
   a substrate misalignment detection mechanism arranged to detect a mechanical force applied by said substrate to said substrate misalignment detection mechanism.

7. A substrate processing system as in claim 6, wherein said substrate detection mechanism comprises at least one alignment structure in said vacuum chamber.

8. A substrate processing system as in claim 7, wherein said alignment structure comprises a pin-shaped body.

9. A substrate processing system as in claim 8, wherein said substrate detection mechanism further comprises at least one detector adapted to detect said mechanical force applied by said substrate to said alignment structure.

10. A substrate processing system as in claim 7, wherein said alignment structure is positioned approximately 0.02 inches from an edge of a properly aligned substrate on said substrate support.

11. A substrate processing system as in claim 9, wherein said detector includes a piezoelectric component.

12. A substrate processing system comprising:
    a vacuum chamber;
    a substrate support in said vacuum chamber;
    a substrate misalignment detection mechanism configured to detect physical contact between a substrate and said substrate misalignment detection mechanism.

13. A substrate processing system as in claim 12, wherein said substrate misalignment detection mechanism includes at least one alignment structure positioned to be physically contacted by said substrate if said substrate is misaligned.

14. A substrate processing system as in claim 12, wherein said misalignment detection mechanism includes a piezoelectric material.

15. A method for detecting substrate misalignment comprising:
    transferring a substrate into a vacuum chamber having a substrate support;
    detecting if the substrate is misaligned with respect to the substrate support by detecting if a mechanical force is applied to a misalignment detection mechanism.

16. A method as in claim 15, wherein at least one portion of said misalignment detection mechanism is positioned adjacent to said substrate support in said vacuum chamber.

17. A method as in claim 16, wherein said detecting a mechanical force comprises detecting a mechanical force applied from a misaligned substrate to said portion of said misalignment detection mechanism positioned adjacent to said substrate support.

18. A method as in claim 17, wherein said mechanical force is detected using a piezoelectric sensor.

19. A method as in claim 15, wherein detecting if the substrate is misaligned is carried out prior to the substrate being positioned on a susceptor in the vacuum chamber.

20. A method for detecting substrate misalignment in a semiconductor processing system comprising:
    transferring a substrate into a vacuum chamber having a substrate support;
    detecting if a physical contact has occurred between a substrate and an alignment structure within said chamber.

21. A method as in claim 20, further comprising positioning said alignment structure adjacent to said substrate support.

22. A method as in claim 20, wherein said physical contact is detected using a piezoelectric sensor connected to said alignment structure.

23. A method as in claim 20, wherein said alignment structure has a pin-shaped portion.

24. A system for processing a substrate, comprising:
    a substrate support in a vacuum chamber;
    an alignment structure in the vacuum chamber; and
    means for detecting physical contact between the substrate and the alignment structure as the substrate is being transferred to the substrate support.

25. A system as in claim 24, wherein the alignment structure includes a plurality of pins connected to a plate positioned below the substrate support, the substrate support including a plurality of openings through which the plurality of pins may extend.

26. A method for detecting substrate misalignment in a processing system, comprising:
    transferring a substrate into a vacuum chamber;
    positioning a structure in said vacuum chamber so that the structure will be contacted by a substrate that is misaligned with respect to a substrate support;
    detecting if the substrate is misaligned with respect to the substrate support by detecting a non-optical signal caused by the substrate contacting the structure.

27. A method as in claim 26, wherein the structure comprises at least one contact pin.

28. A method as in claim 26, wherein the non-optical signal is at least partially caused by the substrate sliding along the structure in the vacuum chamber.

29. A method as in claim 26, wherein at least part of the non-optical signal is generated before any portion of the substrate is positioned on the substrate support.

* * * * *